United States Patent [19]
Michaels et al.

[11] Patent Number: 5,817,359
[45] Date of Patent: Oct. 6, 1998

[54] METHODS FOR DEALCOHOLIZATION EMPLOYING PERSTRATION

[75] Inventors: Alan Sherman Michaels, Chestnut Hill, Mass.; R. Philip Canning, Ontario, Canada; Paul Hogan, Victoria, Australia

[73] Assignee: Palassa Pty. Ltd., Victoria, Australia

[21] Appl. No.: 729,181

[22] Filed: Oct. 11, 1996

Related U.S. Application Data

[63] Continuation-in-part of Ser. No. 204,409, Aug. 1, 1994, abandoned.

[30] Foreign Application Priority Data

Apr. 30, 1992 [AU] Australia ................................. PL2190
Jun. 5, 1992 [AU] Australia ................................. PL2808

[51] Int. Cl.$^6$ ............................ C12H 3/04; B01D 11/04; B01D 61/58
[52] U.S. Cl. ......................... 426/425; 210/639; 210/641; 210/644; 426/14; 426/15; 426/16; 426/431
[58] Field of Search .................................... 210/639, 641, 210/644, 805, 806, 500.36, 640, 650, 651; 426/14, 16, 425, 431, 490, 592, 11, 13, 15

[56] References Cited

U.S. PATENT DOCUMENTS

| 1,765,667 | 6/1930 | Gusmer ................................. 426/592 |
| 2,611,490 | 9/1952 | Robinson ................................ 210/130 |
| 3,186,917 | 6/1965 | Gerhardt et al. . |
| 3,291,613 | 12/1966 | Raible . |
| 3,335,545 | 8/1967 | Robb et al. . |
| 3,425,839 | 2/1969 | Pinnegar ................................. 426/16 |
| 3,502,651 | 3/1970 | Oldenburg . |
| 3,552,574 | 1/1971 | Lowe et al. ............................. 210/353 |
| 3,721,621 | 3/1973 | Hough et al. . |

(List continued on next page.)

FOREIGN PATENT DOCUMENTS

| 33543/68 | 8/1972 | Australia . |
| 2944499 | 5/1981 | Germany ............................... 426/592 |
| 0908012041 | 3/1991 | Germany . |
| 53-24568 | 3/1978 | Japan . |
| 58-78578 | 5/1983 | Japan ..................................... 426/14 |
| 64-23882 | 1/1989 | Japan . |
| 3-30663 | 2/1991 | Japan . |
| 3-89922 | 4/1991 | Japan . |
| 1447505 | 8/1976 | United Kingdom . |
| 2054644 | 2/1981 | United Kingdom ..................... 426/14 |
| 1079517 | 8/1987 | United Kingdom . |
| WO87/02380 | 4/1987 | WIPO . |
| WO88/05768 | 8/1988 | WIPO . |
| WO93/0825 | 4/1993 | WIPO . |

OTHER PUBLICATIONS

Michaels, A.S. and H.J.Bixler, "Membrane Permeation: Theory and Practice" *Progress in Separation and Purification*, edited by E.S.Perry, John Wiley & Sons, Inc., New York, 1968, vol. 1, pp. 143–186.

The Merck Index, 11th Ed., No. 7647, 1989.

*Primary Examiner*—Joseph W. Drodge
*Attorney, Agent, or Firm*—Woodcock Washburn Kurtz Mackiewicz & Norris LLP

[57] ABSTRACT

The present invention provides methods and for the dealcoholization of alcohol containing solutions, especially fermented beverages. In preferred embodiments the methods employ a novel controlled-strip evaporative perstraction technique following initial clarification to remove biomass, wherein strip solutions, dealcoholized beverage, or both are recycled for use in the strip solutions for dealcoholization of subsequent batches of feed beverage. In further preferred embodiments additives are introduced into the strip solution to further limit loss of volatile components during perstraction. Biomass removed by the clarification is then returned to the retentate product following perstration.

20 Claims, 1 Drawing Sheet

U.S. PATENT DOCUMENTS

| | | | |
|---|---|---|---|
| 3,847,163 | 11/1974 | Molyneux | 131/143 |
| 3,865,960 | 2/1975 | Wucherpfennig et al. | 426/239 |
| 3,865,961 | 2/1975 | Wucherpfennig et al. | 426/239 |
| 3,915,820 | 10/1975 | Ito et al. | 204/149 |
| 3,956,112 | 5/1976 | Lee et al. . | |
| 4,015,020 | 3/1977 | Nagasawa et al. | 426/239 |
| 4,083,904 | 4/1978 | Sano et al. . | |
| 4,187,390 | 2/1980 | Gore | 174/102 R |
| 4,218,312 | 8/1980 | Perry . | |
| 4,268,279 | 5/1981 | Shindo et al. . | |
| 4,401,678 | 8/1983 | Beaumont | 526/15 |
| 4,499,117 | 2/1985 | Bonneau | 526/592 |
| 4,532,140 | 7/1985 | Bonnome | 426/13 |
| 4,539,117 | 9/1985 | Meyer et al. | 210/639 |
| 4,581,236 | 4/1986 | Bandel et al. . | |
| 4,610,791 | 9/1986 | Henne et al. | 210/490 |
| 4,610,887 | 9/1986 | Galzy et al. | 426/490 |
| 4,612,196 | 9/1986 | Goldstein et al. . | |
| 4,617,127 | 10/1986 | Light | 210/651 |
| 4,655,927 | 4/1987 | Ford | 210/639 |
| 4,664,918 | 5/1987 | Tilgner et al. | 210/644 |
| 4,728,431 | 3/1988 | Nagura et al. | 210/640 |
| 4,778,688 | 10/1988 | Matson | 426/425 |
| 4,781,837 | 11/1988 | Lefebvre | 210/640 |
| 4,816,407 | 3/1989 | Matson | 210/644 |
| 4,921,612 | 5/1990 | Sirkar | 210/644 |
| 4,952,751 | 8/1990 | Blume et al. | 585/818 |
| 4,963,381 | 10/1990 | Girard et al. | 426/490 |
| 4,983,303 | 1/1991 | Uragami | 210/640 |
| 5,037,554 | 8/1991 | Nomi | 210/640 |
| 5,066,403 | 11/1991 | Dutta et al. | 210/638 |
| 5,076,932 | 12/1991 | Taylor | 210/640 |
| 5,130,024 | 7/1992 | Fujimoto | 210/500 |
| 5,143,526 | 9/1992 | Lee et al. . | |
| 5,281,430 | 1/1994 | Herron et al. | 426/490 |
| 5,382,364 | 1/1995 | Bowser et al. | 210/640 |
| 5,382,365 | 1/1995 | Deblay | 210/644 |
| 5,510,125 | 4/1996 | Gresch | 426/13 |

METHODS FOR DEALCOHOLIZATION EMPLOYING PERSTRATION

CROSS REFERENCE TO RELATED APPLICATIONS

This application is a continuation-in-part of U.S. application Ser. No. 08/204,409, filed Aug. 1, 1994, now abandoned, which is the National Phase of International Application No. PCT/AU93/00196, filed Apr. 30, 1993, and Australian Application Ser. No. PL2808, filed Jun. 5, 1992, and Australian Application Ser. No. PL2190, filed Apr. 30, 1992.

FIELD OF THE INVENTION

This invention relates to novel methods and apparatus for the dealcoholization of alcohol containing solutions, especially fermented beverages such as beer, ale, hard cider, and the like, without significantly altering the concentrations of other essential components which contribute to the flavor, fragrance, color, shelf-stability, and aging characteristics of such products. In preferred embodiments the methods employ a novel controlled-strip evaporative perstraction technique, wherein strip solutions, dealcoholized beverage, or both are recycled for use as a component of the strip solution used for dealcoholization of subsequent batches of feed beverage. In further preferred embodiments additives are introduced into the strip solution to further limit loss of volatile components during perstraction.

BACKGROUND OF THE INVENTION

Several processes are currently employed commercially for the dealcoholization of alcoholic beverages, including vacuum-evaporation, membrane pervaporation, and reverse osmosis. Vacuum-evaporation and membrane pervaporation suffer from the limitations that they remove not only alcohol, but also to varying degrees remove other volatile components such as water, flavor-and fragrance compounds, and dissolved gases such as carbon dioxide and sulfur dioxide which are important in controlling the acidity of the beverage, and sterilizing the beverage against attack by destructive microorganisms. Such composition changes adversely affect the organoleptic properties of the beverage and its appearance and stability, and require restoration to the dealcoholized product of some or all of the components so removed to attempt to render the product suitable for consumption. Not only is this restoration process difficult and costly, but often it fails to return the product to the level of quality it possessed prior to the dealcoholization process. In addition, such restoration may be prohibited in some countries where it is considered adulteration of a natural product.

Dealcoholization by reverse osmosis removes from the beverage not only volatile low molecular weight components such as water, alcohol, flavor and fragrance components, and dissolved gases such as carbon dioxide and sulfur dioxide, but may also remove certain low-molecular-weight, nonvolatile, nonionic solutes such as organic acids and simple sugars. As a consequence, removal of a significant amount of alcohol from a beverage by reverse osmosis may be accompanied by the removal of proportionately large amounts of these other membrane-permeable components. Current practice involves dilution of the reverse-osmosis concentrate or retentate with pure water to replace the water removed in the permeate. As a result, the final dealcoholized product is substantially depleted in other membrane-permeable solutes, with resulting undesirable changes in flavor, fragrance, color, acidity, stability, and the like. Restoration of these depleted components by their re-addition to the concentrate in proper proportions to produce a high-quality product is generally difficult, costly, or impossible.

More recently, another membrane process, usually described as "osmotic distillation", has been proposed for dealcoholization of such beverages. In this process, the beverage is passed over one surface of a microporous, non-liquid-wettable membrane, while another liquid in which alcohol is highly soluble (usually termed the "strip solution") is passed over the opposite surface of the membrane. The liquid most frequently proposed for use as the strip solution is pure water. Any volatile components present in the beverage (as well as those present in the strip solution) are free to pass through the pores of the membrane as vapor, and then to condense in the opposing liquid if there is a favorable concentration difference (and thus vapor pressure difference) of that component between the two solutions. Inasmuch, however, as this process effectively constitutes the extraction of a component from one liquid phase into another across a membrane barrier, we refer herein to osmotic distillation as "isothermal membrane perstraction".

An important advantage of isothermal membrane perstraction over evaporation, pervaporation, and reverse osmosis is that, since the vapor pressure of water over most alcoholic ferments is very nearly that over pure water, there is very little transfer of water from the strip solution to the beverage while rapid transfer of alcohol from the beverage to the strip solution is taking place. Hence, the process, in this mode of operation, is highly selective for removal of alcohol relative to water. As a result, the volume of the solution or beverage and the relative proportions of water and all nonvolatile solutes remain virtually the same in the final product as in the original solution or beverage. This process is described in U.S. Pat. No. 5,382,362 to Bowser et al. (and in U.S. application Ser. No. 08/204,409 to A. S. Michaels).

However, isothermal membrane perstraction has serious limitations which can have adversely affect the properties, characteristics, and quality of a dealcoholized beverage obtained thereby. Since the membrane employed for that process is freely permeable to any volatile solute which may be present in either liquid phase in contact with it, the volatile components present in the original beverage are free to leave the beverage and dissolve in the strip solution if the activity of any such solute is higher in the beverage than in the strip solution. Thus, volatile flavor and fragrance components, as well as dissolved gases such as carbon dioxide and sulfur dioxide, which may be present in the original beverage, can be depleted during the perstraction process.

Moreover, any volatile solute which is present initially in the strip solution, and is absent from the initial beverage, may similarly transfer into the beverage, thereby contaminating it. If, as proposed in the Bowser patent, pure water is used as the strip liquid, it will almost invariably contain dissolved oxygen with which it is in substantial equilibrium with the ambient atmosphere. Most ingestible ferments (wine, beer, and the like) are rendered alcoholic by fermentation of sugars via anaerobic organisms such as yeast, and thus are virtually free of dissolved oxygen. This is an important feature of the fermentation process, since many of the components which are generated in the process are reduced organic compounds which are responsible for the characteristic fragrance, flavor, color, and acidity of the product. Exposure of these components to elemental oxygen may, and usually does, result in their oxidation to new chemical entities which differ markedly in organoleptic properties and appearance from those of the original ferment, and frequently have objectionable taste, odor, and/or color. Consequently, exposure of the original beverage during evaporative perstraction to a strip solution comprising pure water containing dissolved oxygen can result in permanent damage to the dealcoholized product, and render it unsuitable for consumption.

Improved methods for the dealcoholization are needed which do not suffer from the aforementioned limitations. This invention is directed to this important end.

SUMMARY OF THE INVENTION

The present invention provides novel methods and apparatus for dealcoholization of alcohol containing solutions, particularly beverages such as wine, beer, ale, hard cider, and the like.

In certain embodiments, the present invention provides methods for the dealcoholization of alcohol containing solutions comprising:

(a) contacting a first side of a hydrophobic microporous membrane with an alcohol-containing feed solution;

(b) contacting the opposite side of said membrane with a strip solution to extract alcohol from said alcohol-containing solution into said strip solution and thereby to provide
an alcoholized strip solution and
a dealcoholized product;

(c) recovering the dealcoholized product and the alcoholized strip solution; and (d) repeating steps (a) and (b) while recycling at least some of (1) the recovered dealcoholized product or (2) the recovered alcoholized strip solution to the alcohol containing solution of step (a) and/or to the strip solution of step (b).

In some preferred embodiments at least some of the alcoholized strip solution recovered in step (c) is recycled and mixed with the strip solution of step (b), and in other preferred embodiments at least some of the dealcoholized product produced in step (c) is used in the strip solution of step (b). In further preferred embodiments at least some of the alcoholized strip solution recovered in step (c) and at least some of the dealcoholized solution recovered in step (c) is recycled to the strip solution of step (b). In some preferred embodiments the recovered dealcoholized solution is recycled to the alcohol-containing solution of step (a).

Preferred embodiments further comprise selecting a desired amount of alcohol to be removed from the alcohol-containing solution, and using the minimum amount of alcoholized strip solution, dealcoholized solution, or both in the second strip solution to remove the desired amount of alcohol.

Preferably, the strip solution is pure water, which has preferably been deoxygenated by boiling and flushing with a gas, or by addition of reducing agent.

In further preferred embodiments the strip solutions are saturated with carbon dioxide, preferably by bubbling in carbon dioxide gas, or by addition of solid carbon dioxide.

In yet further preferred embodiments a stabilizing agent, preferably sulfur dioxide, sodium bisulfite, potassium bisulfite, sodium metabisulfite, or potassium metabisulfite is added to the strip solutions.

In preferred embodiments the alcohol-containing feed solution is a beverage, particularly wine, beer, ale, or hard cider. Preferably, the alcohol-containing feed solutions are clarified prior to contacting the hydrophobic microporous membrane, preferably by crossflow membrane microfiltration or vortex flow membrane microfiltration.

The hydrophobic microporous membrane is preferably comprised of polyethylene, polypropylene, polyalkylsilane, polyalkarylsilane, polysulfone, or polycarbonate, with polypropylene being particularly preferred.

Also provided in accordance with the present invention are apparatus for performing the controlled-strip evaporative perstraction methods.

BRIEF DESCRIPTION OF THE DRAWINGS

The numerous objects and advantages of the present invention may be better understood by those skilled in the art by reference to the accompanying FIG. 1, which is a basic illustration of a preferred embodiment of the dealcoholization method of the invention.

DETAILED DESCRIPTION OF THE PREFERRED EMBODIMENTS

Figure 1:
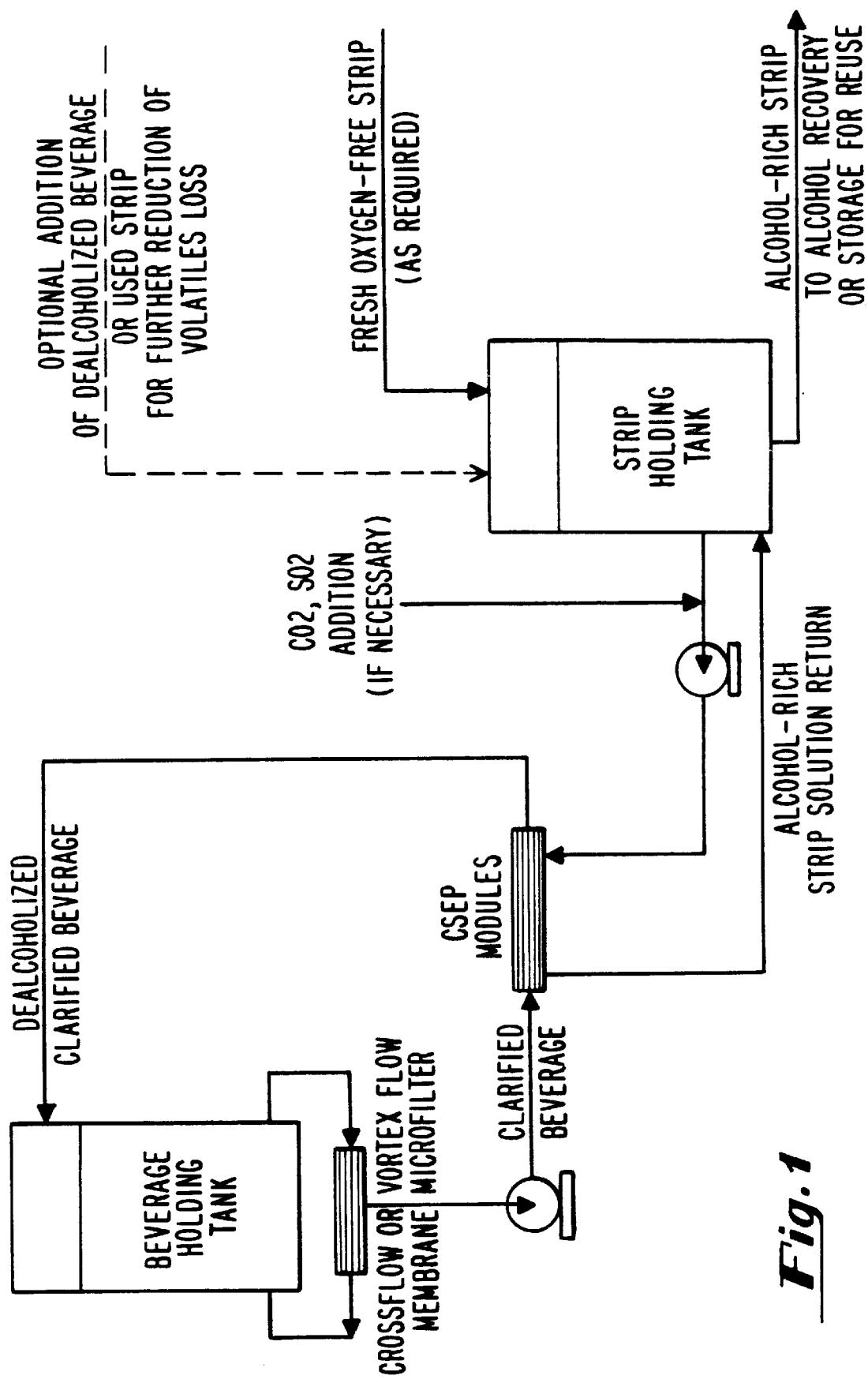

This invention provides novel methods and apparatus for reducing the alcohol content of alcohol-containing solutions. The "controlled-strip evaporative perstraction" (CSEP) methods of the invention selectively remove alcohol from alcohol-containing solutions, such as alcoholic beverages, while avoiding the serious limitations of existing osmotic distillation methods. Specifically, the methods of the invention remove alcohol without concurrently removing significant quantities of other essential components, and without subjecting the product to destructive oxidative deterioration by exposure to atmospheric oxygen.

In preferred embodiments, the solution from which alcohol is to be removed is a beverage, especially a wine, beer, ale, or the like. However, the methods of the invention are amenable to the partial or complete dealcoholization of a wide variety of alcohol containing solutions.

In accordance with the multistep strip-recycling dealcoholization methods of the present invention, the absolute and relative concentrations of all non-alcohol volatile components in the strip solution are advantageously maintained as close as possible to those initially present in the alcohol-containing feed solution. Thus, the methods of the present invention minimize the extraction of desirable volatile components from the feed during the dealcoholization process. These desirable volatile components include the volatile flavor and fragrance components which impart the desired organoleptic properties to the alcoholic beverage; volatile acidic components, such as carbon dioxide, which impart the proper acidity to the product; and volatile stabilizing additives, such as sulfur dioxide, which insure product sterility and protect against oxidative degradation of the product on storage and aging.

The methods of the present invention advantageously maximize the difference in alcohol activity and/or alcohol concentration between the feed solution or the dealcoholized product and the alcohol activity and/or alcohol concentration in the strip solution on the opposite side of the membrane. Accordingly, the methods of the invention maximize the rate at which alcohol can be selectively extracted from the feed and transferred to the strip solution.

In preferred embodiments of the methods of the invention, pure water is used as the initial strip solution. It is preferable that the strip solution is devoid of any foreign volatile component, such as dissolved oxygen, which can transfer into the feed and/or product and damage the product. It is also preferable that the strip solution be unable to extract from the feed solution appreciable amounts of any critical volatile component of the feed solution, such as carbon dioxide and/or sulfur dioxide, the removal of which might cause irreversible damage to the product.

Accordingly, in preferred embodiments of the methods of the invention, the water to be used as the initial strip solution is pretreated to remove dissolved oxygen, and to dissolve therein sufficient carbon dioxide, and sulfites (i.e., sulfur dioxide) to provide concentrations or activities of these solutes substantially equal to those present in the alcohol-containing feed solution.

In some preferred embodiments, a first side of a hydrophobic microporous membrane is contacted with an alcohol-containing feed solution, and the opposite side of the membrane is contacted with a strip solution, and a desired amount alcohol is perstracted from the feed solution into the strip solution. As used herein, the term "contacting" means directly or indirectly causing the moieties to be contacted to come into physical association with each other.

Typically, the feed solution is circulated from a holding tank through a membrane unit and is returned to the holding tank for further recirculation through the membrane until the desired alcohol content is achieved. However, in some instances it is preferable to subject the feed beverage to only a single pass through the membrane, to avoid spoilage of the beverage due to the turbulence of the recirculation process. In such instances, the feed solution is not returned to the holding tank, but rather is collected and stored.

The membrane unit can be any of a variety of devices known in the art to be useful in osmotic distillation processes. In preferred embodiments the membrane unit is a container which provides for the through-circulation of strip and feed solutions on opposite sides of the microporous membrane. One suitable membrane unit is the "Liquicel" unit, manufactured by Hoechst Celanese, Charlotte, N.C.

The microporous membrane can be any of the variety of hydrophobic, microporous membrane materials known to be useful in osmotic distillation. Generally, such membranes are derived from polymeric materials which do not include hydrophilic groups in their network. Examples of these membranes include polyolefins such as polyethylenes, polypropylenes, polyisopropylenes, polyvinylidenes, or mixtures thereof.

Suitable hydrophobic membranes include microporous polypropylene membranes in the form of flat sheets or hollow fibers manufactured by Hoechst Celanese Separations Products Division, Charlotte, N.C., and sold under the name "Celgard", particularly "Celgard 2500", and those manufactured by AKZO NV, Wuppertal, Germany, and sold under the name "Accurel." It is preferable that the membrane be in the form of a hollow fiber, as it has been found that hollow fiber membranes have superior fluid management properties, and are more efficient due to their greater surface area relative to flat sheet fibers.

The initial strip solution is preferably pure water which has been deoxygenated. As used herein, the term "deoxygenated" means containing substantially no molecular oxygen. Deoxygenation of the strip solution can be achieved by any of the several methods known in the art, including, for example, simple steam-stripping of the water by allowing it to boil (either at atmospheric pressure, or under reduced pressure), flushing the vapor space with an inert gas such as nitrogen or carbon dioxide, and storing the strip solution in a vessel blanketed with such gas.

Another suitable deoxygenation technique is to subject the strip solution to pervaporative stripping under reduced pressure using a microporous membrane device, such as a microporous polyolefin hollow fiber module such as those sold by Hoechst Celanese Separations Systems Division. Another suitable method is to add to the strip solution a reducing agent which will combine with oxygen present to form a chemically inert, nontoxic, nonvolatile oxidation product. Preferred reducing agents for this purpose are alkali metal sulfites such as sodium bisulfite, sodium metabisulfite, potassium bisulfite, or potassium metabisulfite, since these additives have been approved for use as stabilizers in wines and other alcoholic beverages.

In preferred embodiments the strip solution is saturated with carbon dioxide. Since the initial beverage to be dealcoholized will usually be saturated with carbon dioxide, similar saturation of the strip solution will assure that there will be no transfer of carbon dioxide into or out of the beverage, and thus no change in beverage acidity. Saturation of the strip solution with carbon dioxide can be accomplished by any of several known techniques. One suitable technique is by bubbling carbon dioxide gas into the liquid. Another suitable technique is by adding solid carbon dioxide ("dry ice") to the liquid.

For feed solutions which contain sulfites, it is preferable that there be no net transfer of sulfur dioxide into or out of the feed solution during dealcoholization. In preferred embodiments this is achieved by maintaining the sulfite content of the strip solution is as close as possible to the sulfite content of the feed solution from which alcohol is to be removed. This can be accomplished by analyzing the alcohol-containing feed solution to ascertain its sulfite content, and adding an appropriate amount of sulfur dioxide or metabisulfite to the strip solution to match that of the feed solution. The sulfur dioxide or metabisulfite can be added to the feed solution before or after saturation with carbon dioxide, it only being necessary that the feed solution contain the proper sulfite and carbon dioxide content before dealcoholization across the microporous membrane.

In typical osmotic distillation processes, volatile flavor and fragrance components present in the feed solution are free to transfer by evaporation and condensation from the feed solution into the strip solution. One way of minimizing the loss of these desirable components is to analyze the feed solution to ascertain the identities and relative proportions of these components, and to then add the proper amounts of the components to the strip solution. This is a costly and arduous analytical task. In preferred embodiments of the methods of the present invention, however, the strip solution is composed of pure water to which has been added either strip solution or dealcoholized product recycled from the perstraction of a previous batch of the identical feed solution. Accordingly, the methods of the present invention provide a strip solution containing the desired volatile flavor and fragrance components in the proper proportion, eliminating the need to ascertain either the identities or the proportions of these desired components.

In preferred embodiments of the present invention the loss of these volatile flavor and fragrance components from the feed solution is further limited by operating the perstractive method in a "batch-recycle mode". In this mode a fixed volume of feed solution is recycled through the membrane unit, while simultaneously recycling a fixed volume of strip solution. The amount (i.e., volume) of strip solution that is so recycled is selected to be the minimum required to allow removal of the desired fraction of alcohol from the product, thus minimizing loss of volatile components. For example, for many high-quality varietal wines, the objective of dealcoholization is to reduce the alcohol concentrations of excessively-high-alcohol-content ferments (so called "hot" wines; typically about 15% alcohol by volume) to slightly lower levels where they are more palatable (typically about 12% by volume). This can be accomplished using a batch recycle mode wherein a first batch of feed wine is perstracted using a strip solution that is alcohol-free at the beginning of the run, and which contains 10% alcohol by volume at the end of the run. This will typically require about 30 liters of strip solution for each 100 liters of feed wine. The maximum reduction in the concentration of flavor and fragrance volatile components in the final product will thus be only about 30%. The 10% alcohol strip solution remaining after the first batch has been treated is then used as a first strip solution for a second batch of feed wine. This is then followed by replacement of the alcohol-rich strip with fresh, alcohol-free solution thus further reducing the loss of flavor and fragrance volatile components. Such a "sequentially strip-replacement" strategy can keep the loss of volatile components from the product at negligibly low levels. Thus, in one aspect the invention provides perstraction methods wherein at least some of the alcoholized strip solution produced from the dealcoholization of an initial batch of feed solution is used in the strip solution for dealcoholization of succeeding batches of feed solution.

In another aspect of the invention a further beneficial reduction in volatile components loss during dealcoholization can be achieved by retaining a fraction of the dealcoholized product generated from a prior batch of the same feed stock, and adding this solution to the primary strip solution employed during the first stage of dealcoholization of the subsequent batch. In this manner, the concentration of all volatile components (except alcohol) in the strip solution is elevated, and thus the rate of transfer of such volatile components from the feed to the strip is thereby reduced.

Further aspects of the present invention are directed toward the dealcoholization of superior-quality vintage wines, which require fermentative aging under special conditions to develop the desired flavor, fragrance mouth-feel and related attributes so important to their marketability. Such wines, after primary vat-fermentation, are separated from the lees (fruit residue and fermentation biomass), but are allowed to retain in suspension low concentrations of non-viable yeast cells. These cells contain a variety of active enzymes which can act upon residual sugars, polysaccharides, organic acids, and flavor and fragrance precursors present in the ferment and catalyze their transformation into new compounds which are essential to the development of superior flavor and "nose" in the final aged product. This process requires the presence of this biomass, and is accomplished by barrel-aging of the vat-ferment. For optimal conduct of this secondary fermentation, it is important that the suspended cells remain intact, and that the alcohol content of the ferment be maintained within a narrow concentration range. Vintages which yield fruit of high sugar content tend to produce vat ferments containing excessively high alcohol concentrations, so the reduction of the alcohol content of such ferments (so-called "trimming") is necessary to achieve optimal in-barrel secondary fermentation.

Most conventional dealcoholization processes are quite destructive of such suspended cells, and thus retard or prevent this secondary fermentation process. Concentration by evaporative membrane perstraction would mitigate this cell damage, were it not for the problem that suspended particulates tend to foul the membranes and make dealcoholization difficult or impractical. This problem can be avoided by subjecting the primary ferment to membrane prefiltration in order to temporarily remove the suspended biomass without significant cell damage, followed by controlled dealcoholization of the clarified ferment, and then returning the biomass to the dealcoholized product. The resulting product now contains the optimal alcohol concentration, and the fully active biomass content, required for optimal in-barrel secondary fermentation.

Prefiltration is carried out using either microfiltration or ultrafiltration membranes, and modular devices containing such membranes which provide tangential flow or vortex flow in the feed channels, permitting high-flow separation of the biomass from the ferment at low pressure, with minimal damage to the suspended cells. Removal of as much as 90% of the liquid volume as clarified filtrate can be achieved in this manner, yielding a concentrated biomass suspension which can readily be blended back with the dealcoholized filtrate. Since all other volatile components present in the primary ferment are conserved in this process, the product provided for barrel fermentation is virtually undistinguishable from the initial ferment except for its reduced alcohol content. Via this novel hybrid process, the production of superior barrel-aged varietal wines is now possible.

The invention is further illustrated by way of the following examples which are intended to elucidate the invention. These examples are not intended, nor are they to be construed, as limiting the scope of the disclosure.

EXAMPLES

Illustration of Controlled-Strip Evaporative Perstraction in Batch Recycle Mode

FIG. 1 shows a flow-diagram illustrating a preferred embodiment of the present invention. The dealcoholization apparatus consists of a feed holding tank containing an alcohol-containing solution, typically a beverage; a crossflow or vortex flow microfilter loop for clarifying the alcohol-containing solution; one or more controlled-strip evaporative perstraction (CSEP) modules, each of which include one or more hydrophobic microporous membranes; a pump and attendant piping for pumping the alcohol-containing feed solution through the CSEP modules and returning at least a portion of the alcohol-depleted solution to the feed beverage holding tank; a strip holding tank containing a strip solution; a pump and attendant piping for pumping the strip solution through the membrane module and returning at least a portion of the alcoholized strip solution to the strip holding tank; an inlet in the strip holding tank for adding fresh strip solution to the strip holding tank; an inlet in the strip holding tank for adding alcoholized strip solution or alcohol-depleted solution to the strip holding tank; an inlet for adding additives such as carbon dioxide or sulfur dioxide to the strip solution, located either in the strip holding tank or in the connecting line between the strip holding tank and the CSEP modules; and an outlet for removing alcoholized strip solution from the strip tank.

Initially, a first batch of alcohol-containing feed beverage is placed in the beverage holding tank, and a fresh, deoxygenated, alcohol-free water strip solution is placed in the strip holding tank. The strip solution is saturated with carbon dioxide, and, if necessary, sulfur dioxide is added to the strip solution to match the sulfite content of the feed beverage. This can be done either in the strip holding tank, or in the line from the strip holding tank to the CSEP modules.

The feed beverage is pumped from the beverage holding tank into a crossflow or vortex flow microfilter loop, wherein it is passed through a crossflow or vortex flow microfilter, which clarifies the feed beverage by filtering out large suspended particles, which are typically cells or other biomass present in the beverage. The filtered biomass is returned to the beverage holding tank, and the clarified feed beverage is pumped through the controlled-strip evaporative perstraction (CSEP) modules, where alcohol is perstracted from the feed beverage to the strip solution, which is on the opposite side of the membrane. The dealcoholized clarified beverage is then typically returned to the beverage holding tank for another circulation through the system, or the pumping of feed beverage is ceased after a single pass through the perstraction unit. The strip solution is simultaneously pumped from the strip holding tank, through the CSEP modules, and is returned to the strip holding tank. At the end of the initial run, a second batch of fresh feed beverage is placed in the beverage holding tank, and a second strip solution is placed in the strip holding tank. The second strip solution is composed of fresh, deoxygenated strip solution, and at least some of the dealcoholized beverage from the initial run, or some of the alcoholized strip solution produced in the initial run, or both. The presence of these components in the second strip solution reduces the loss of volatile components to minimal values. The amount volume of strip solution that is recycled is selected to be the minimum required to allow removal of the desired fraction of alcohol from the product. The second feed beverage is then dealcoholized using the second strip solution, followed by dealcoholization with fresh strip solution. The process of retaining used strip solution and/or dealcoholized beverage for use in the dealcoholization of succeeding batches of beverage is repeated until the desired amount of dealcoholized beverage is produced.

It will be appreciated that the benefits of the foregoing "batch mode" embodiment can also be obtained by using a continuous process, wherein fresh feed and fresh strip solution are continuously added to the system, and appropriate amounts of dealcoholized beverage and used strip solution are continuously added to the strip solution, and product continuously removed.

Each of the patents, publications, and other published documents mentioned or referred to in this specification is herein incorporated by reference in its entirety.

As those skilled in the art will appreciate, numerous changes and modifications may be made to the preferred embodiments of the invention without departing from the spirit of the invention and the scope of the appended claims.

What is claimed is:

1. A method of reducing the alcohol content of an alcohol-containing solution comprising:
    (a) clarifying a fermented alcohol-containing feed solution to remove suspended biomass;
    (b) contacting a first side of a hydrophobic microporous membrane with the alcohol-containing feed solution;
    (c) contacting the opposite side of the membrane with a strip solution to extract alcohol from said alcohol-containing solution into said strip solution and thereby to provide
    an alcoholized strip solution and
    a dealcoholized product;
    (d) recovering the dealcoholized product and the alcoholized strip solution;
    (e) repeating steps (b) and (c) while recycling at least some of (1) the recovered dealcoholized product or (2) the recovered alcoholized strip solution to the alcohol containing solution of step (a); to the strip solution of step (b); or to both the alcohol containing solution of step (a) and to the strip solution of step (b); and
    (f) returning at least some removed biomass to the dealcoholized product.

2. The method of claim 1 wherein at least some of the dealcoholized product recovered in step (d) is recycled to the strip solution of step (c).

3. The method of claim 1 wherein at least some of the alcoholized strip solution recovered in step (d) is recycled to the strip solution of step (c).

4. The method of claim 1 wherein at least some of the dealcoholized product recovered in step (d) and at least some of the alcoholized strip solution recovered in step (d) is recycled to the strip solution of step (c).

5. Then method of claim 1 wherein at least some of the dealcoholized product recovered in step (d) is recycled to the alcohol-containing feed solution of step (b).

6. The method of claim 1 further comprising the step of selecting a desired amount of alcohol to be removed from the alcohol-containing feed solution by steps (b), (c) and (e).

7. The method of claim 6 wherein the amount of alcoholized strip solution, dealcoholized product, or both recycled to the strip solution of step (c) is the minimum amount required to remove the desired amount of alcohol.

8. The method of claim 1 wherein the strip solution is pure water.

9. The method of claim 1 further comprising deoxygenating the strip solution prior to contacting said strip solution with said membrane.

10. The method of claim 9 wherein the strip solution is deoxygenated by boiling and flushing with a gas, or by addition of reducing agent.

11. The method of claim 1 further comprising saturating the strip solution with carbon dioxide.

12. The method of claim 11 wherein the strip solution is saturated with carbon dioxide by bubbling in carbon dioxide gas or by addition of solid carbon dioxide.

13. The method of claim 1 further comprising adding a stabilizing agent to the strip solution.

14. The method of claim 13 wherein the stabilizing agent is sulfur dioxide, sodium bisulfite, potassium bisulfite, sodium metabisulfite, or potassium metabisulfite.

15. The method of claim 1 wherein the alcohol-containing solution is clarified by crossflow membrane microfiltration or vortex flow membrane microfiltration.

16. The method of claim 1 wherein the alcohol-containing solution is a beverage.

17. The method of claim 16 wherein the beverage is wine, beer, ale, or hard cider.

18. The method of claim 1 wherein the hydrophobic microporous membrane is selected from the group consisting of polyethylene, polypropylene, polyalkylsilane, polyalkarylsilane, polysulfone, and polycarbonate membranes.

19. The method of claim 18 wherein the hydrophobic microporous membrane is a polypropylene membrane.

20. An improved osmotic distillation method for reducing the alcohol content of an alcohol-containing solution comprising clarifying a fermented alcohol-containing feed solution; deoxygenating a strip solution, saturating the strip solution with carbon dioxide, dealcoholizing the alcohol-containing solution and simultaneously alcoholizing the strip solution; and recycling at least a portion of the alcoholized strip solution or the dealcoholized feed solution for use in the strip solution.

* * * * *